(12) United States Patent
Goto

(10) Patent No.: US 12,009,624 B2
(45) Date of Patent: Jun. 11, 2024

(54) TERMINAL HOLDING STRUCTURE AND WIRING MODULE

(71) Applicant: SUMITOMO WIRING SYSTEMS, LTD., Mie (JP)

(72) Inventor: Tadashi Goto, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 372 days.

(21) Appl. No.: 17/428,742

(22) PCT Filed: Nov. 27, 2019

(86) PCT No.: PCT/JP2019/046436
§ 371 (c)(1),
(2) Date: Aug. 5, 2021

(87) PCT Pub. No.: WO2020/162001
PCT Pub. Date: Aug. 13, 2020

(65) Prior Publication Data
US 2022/0109253 A1    Apr. 7, 2022

(30) Foreign Application Priority Data

Feb. 6, 2019 (JP) .................................. 2019-019434

(51) Int. Cl.
| | |
|---|---|
| H01R 4/46 | (2006.01) |
| H01M 50/204 | (2021.01) |
| H01M 50/507 | (2021.01) |
| H01M 50/567 | (2021.01) |
| H01R 4/30 | (2006.01) |

(52) U.S. Cl.
CPC ............ *H01R 4/30* (2013.01); *H01M 50/204* (2021.01); *H01M 50/507* (2021.01); *H01M 50/567* (2021.01)

(58) Field of Classification Search
CPC .................................... H31R 4/34; H31R 4/32
USPC .................................................. 439/810, 811
See application file for complete search history.

(56) References Cited

U.S. PATENT DOCUMENTS

| | | | | |
|---|---|---|---|---|
| 1,652,927 | A | * 12/1927 | Buchanan | ............. H01L 29/417 |
| | | | | 439/862 |
| 3,630,261 | A | 12/1971 | Gley | |
| 5,197,905 | A | * 3/1993 | Troschel | .............. H01R 13/207 |
| | | | | 439/737 |

(Continued)

FOREIGN PATENT DOCUMENTS

| | | |
|---|---|---|
| JP | S54-020615 Y2 | 7/1979 |
| JP | S54-027503 B2 | 9/1979 |

(Continued)

OTHER PUBLICATIONS

International Search Report dated Mar. 3, 2020 for WO 2020/162001 A1 (4 pages).

*Primary Examiner* — Phuong K Dinh
(74) *Attorney, Agent, or Firm* — Venjuris, P.C.

(57) ABSTRACT

A screw insertion hole 24 into which a cylindrical shaft portion 17 of a screw 16 is to be inserted is formed in a terminal accommodation portion 22. Also, a guide pin 25 made of metal is provided through insert molding so as to correspond with the screw insertion hole 24. The guide pin 25 is for matching a direction in which the screw 16 advances with a prescribed direction, that is, a vertical direction orthogonal to a fastening surface 23.

8 Claims, 3 Drawing Sheets

(56) References Cited

U.S. PATENT DOCUMENTS 7,364,456 B2 * 4/2008 Yeh ........................ H01M 50/50
439/500

FOREIGN PATENT DOCUMENTS

| JP | 3048509 U | 5/1998 |
| JP | 2016-201336 A | 12/2016 |

* cited by examiner

Prior Art

TERMINAL HOLDING STRUCTURE AND WIRING MODULE

CROSS REFERENCE TO RELATED APPLICATIONS

This application is a national phase of PCT application No. PCT/JP2019/046436, filed on 27 Nov. 2019, which claims priority from Japanese patent application No. 2019-019434, filed on 6 Feb. 2019, all of which are incorporated herein by reference.

TECHNICAL FIELD

The present invention relates to a terminal holding structure in which a terminal is fastened to a case with a screw, and a wiring module.

BACKGROUND

For example, as disclosed in Patent Document 1, in a vehicle such as an electric automobile or a hybrid automobile, a battery wiring module is provided in a high-voltage secondary battery mounted as a travel drive power source. The battery wiring module includes wiring composed of bus bars connected to connection terminals that extend from the secondary battery side, wires that are connected to the bus bar, and the like, a housing including a wiring accommodation portions that accommodate the wiring, a cover for closing openings of the wiring accommodation portions, and the like. The housing and the cover are formed through injection molding of a synthetic resin material.

PRIOR ART DOCUMENT

Patent Document

Patent Document 1: JP 2016-201336A

SUMMARY OF THE INVENTION

Problems to be Solved

As shown in FIG. 4, when a terminal 51 provided on an end portion of a wire is fastened to a resin case 52 with a screw 53, it is necessary to perform the fastening task while the screw 53 is kept perpendicular to the fastening surface, and thus there is concern about a reduction of the task efficiency resulting from specialty work. If the screw 53 advances at an incline, resulting in inclined fastening, there is concern about a reduction in the connection reliability resulting from wobbling of the terminal 51.

The present invention was made in order to solve the above-described problem, and an object thereof is to provide a terminal holding structure and a wiring module according to which it is possible to improve the task efficiency of a fastening task.

Means to Solve the Problem

A terminal holding structure for solving the above-described problem is a terminal holding structure in which a terminal is fastened to a case with a screw, in which a guide member for matching a direction in which the screw advances with a prescribed direction is provided in the case.

According to this configuration, the case is provided with a guide member that matches the direction in which the screw advances with a prescribed direction, and therefore it is possible to avoid inclined fastening while easily matching the direction in which the screw advances with the prescribed direction by performing the fastening task while aligning the screw with a guide member. Accordingly, the specialty task can be mitigated, and the task efficiency of the fastening task can be improved.

With the above-described terminal holding structure, it is preferable that the screw has a shaft portion with a screw thread formed on its outer surface, and a screw insertion hole into which the shaft portion is to be inserted is formed in the case, and an inner surface of the screw insertion hole is a smooth surface on which no screw thread is formed.

According to this configuration, no screw thread is formed on the inner surface of the screw insertion hole, and therefore the screw is likely to advance freely and inclined fastening is likely to occur. However, inclined fastening is avoided due to the screw being guided by the guide member, whereby high connection reliability can be obtained. That is, it is possible to overcome the state in which inclined fastening is likely to occur.

With the above-described terminal holding structure, it is preferable that the screw has a cylindrical shaft portion with a screw thread formed on its outer surface, and the guide member is a guide pin that is to be inserted into the cylindrical shaft portion of the screw, and a leading end portion of the guide pin is located on an upstream side in the advancement direction of the screw relative to a fastening surface that is located at a height at which advancement of the screw thread is started.

According to this configuration, the leading end portion of the guide pin serving as the guide member is located upstream in the advancement direction of the screw relative to the fastening surface located at the height at which the advancement of the screw thread is started, and therefore it is possible to set the screw such that the cylindrical shaft portion is placed on the leading end portion of the guide pin at a stage prior to starting the advancement of the screw thread. Accordingly, it is possible to smoothly realize automation of screw fastening.

With the above-described terminal holding structure, it is preferable that at least one of the inner surface of the cylindrical shaft portion of the screw and an outer surface of the guide pin to be inserted into the shaft portion is a smooth surface on which no screw thread is formed.

According to this configuration, no screw thread is formed on at least one of the inner surface of the cylindrical shaft portion of the screw and the outer surface of the guide pin to be inserted into the shaft portion, and therefore it is possible to cause the screw thread formed on the outer surface of the cylindrical shaft portion of the screw to advance smoothly, and it is possible to suitably carry out the fastening task.

With the above-described terminal holding structure, it is preferable that the guide member is a guide pin made of metal.

According to this configuration, by using a metallic guide pin as the guide member, high strength is obtained in the guide member, and therefore even if this configuration is applied to a small-size holding structure in which a screw with a small diameter is guided by a narrow guide pin, the fastening task can be carried out suitably.

With the above-described terminal holding structure, it is preferable that the case is composed of a material that is softer than that of the screw.

According to this configuration, the case is composed of a material that is softer than that of the screw, and therefore the screw is likely to advance freely and inclined fastening is likely to occur. However, inclined fastening is avoided due to the screw being guided by the guide member, and high connection reliability can be obtained. That is, it is possible to overcome the state in which inclined fastening is likely to occur.

A wiring module for solving the above-described problem is a wiring module in which a terminal is fastened to a case with a screw, in which a guide member for matching a direction in which the screw advances with a prescribed direction is provided in the case, and a spring portion that is electrically connected by coming into elastic contact with a connection destination of the terminal is provided on the terminal.

According to this configuration, the case is provided with a guide member that matches the direction in which the screw advances with a prescribed direction, and therefore it is possible to avoid inclined fastening while easily matching the direction in which the screw advances with the prescribed direction by performing the fastening task while aligning the screw with the guide member. Accordingly, the specialty task can be mitigated, and the task efficiency of the fastening task can be improved.

Also, since the terminal is provided with a spring portion that is electrically connected by coming into elastic contact with the connection location of the terminal, if inclined fastening occurs, suitable elastic contact is not obtained and the connection reliability is likely to be lost due to wobbling of the terminal. However, wobbling of the terminal is avoided due to the screw being guided by the guide member, and thus suitable elastic contact can be obtained. That is, it is possible to overcome the state in which the connection reliability is likely to be lost.

Effect of the Invention

According to the terminal holding structure and the wiring module of the present invention, it is possible to improve the task efficiency of the fastening task.

DETAILED DESCRIPTION TO EXECUTE THE INVENTION

Figure 1:
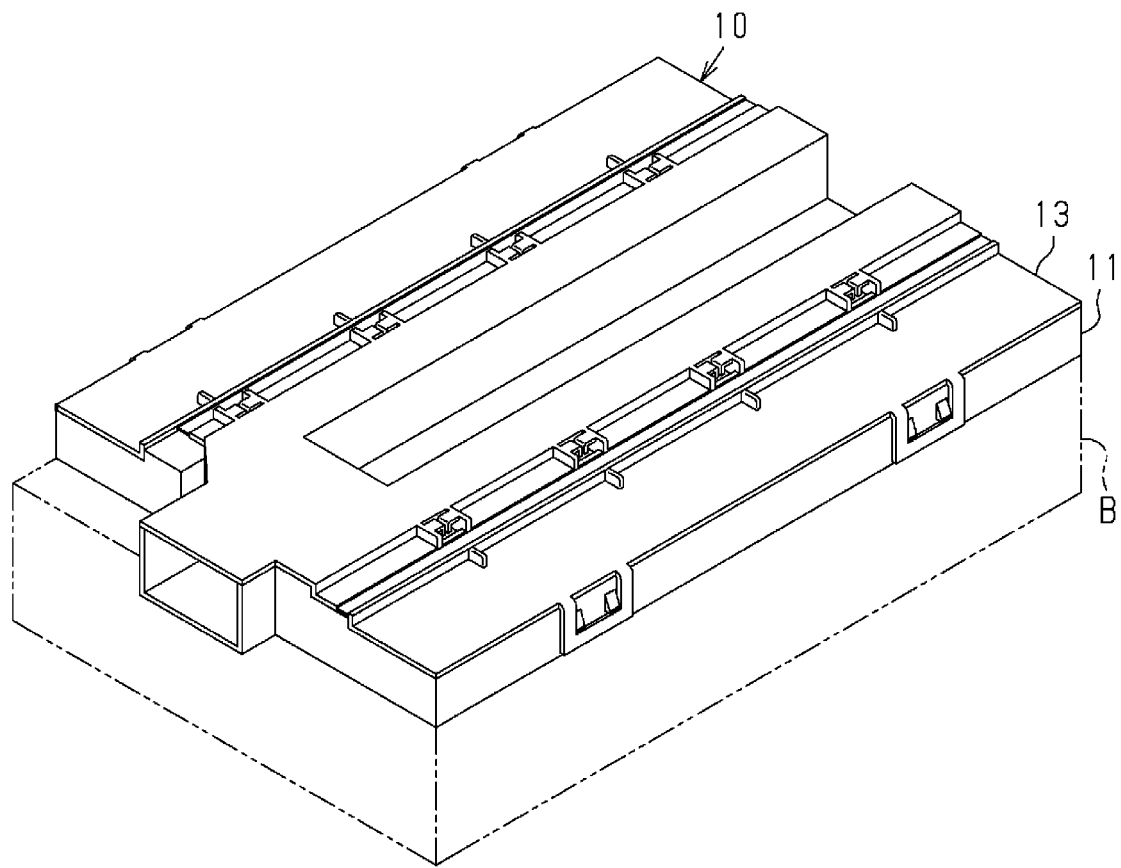
FIG. 1 is a perspective view showing a battery wiring module of an embodiment.

Hereinafter, an embodiment of a terminal holding structure and a wiring module will be described with reference to the drawings. Note that in the drawings, some configurations are shown exaggerated or simplified in some cases for the sake of convenience in the description. Also, the dimensional proportions of the portions differ from the actual dimensional proportions in some cases.

A battery wiring module 10 shown in FIG. 1 is mounted on a high-voltage vehicle-mounted secondary battery B provided in a vehicle such as an electric automobile or a hybrid automobile. The secondary battery B supplies power to a travel drive motor (not shown), and is charged by power generated from the motor and a power generator in response to a charging state.

Figure 2:
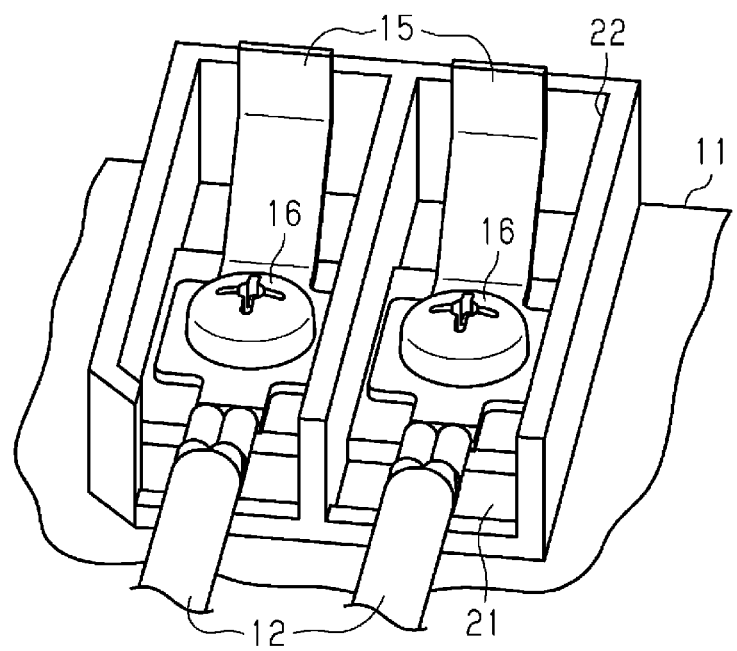
FIG. 2 is a perspective view showing a terminal holding structure in which a terminal is fastened to a terminal accommodation portion with a screw.

The battery wiring module 10 includes a housing 11 that is attached to the upper portion of the secondary battery B, multiple bus bars (not shown) that are accommodated in the housing 11, multiple wires 12 (two are shown in FIG. 2) that are accommodated in the housing 11 and are connected to the bus bars, and a cover member 13 for closing an opening of the housing 11. The housing 11 and the cover member 13 are formed through, for example, injection molding of a polyamide-based synthetic resin material.

As shown in FIG. 2, the housing 11 includes multiple bus bar accommodation portions (not shown) that are open upward, wire accommodation portions 21 that are similarly open upward, as well as terminal accommodation portions 22 at which terminals 15 provided on the end portions of the wires 12 are fastened with screws 16. The terminal accommodation portions 22 correspond to examples of cases.

Figure 3A:
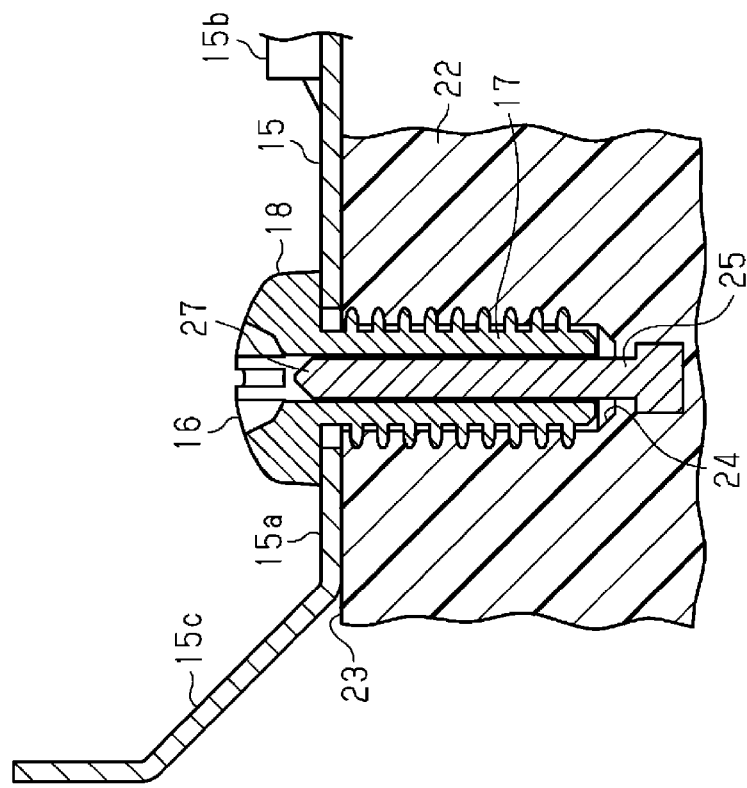
FIG. 3A is a cross-sectional view showing a terminal holding structure prior to screw fastening.
Figure 3B:
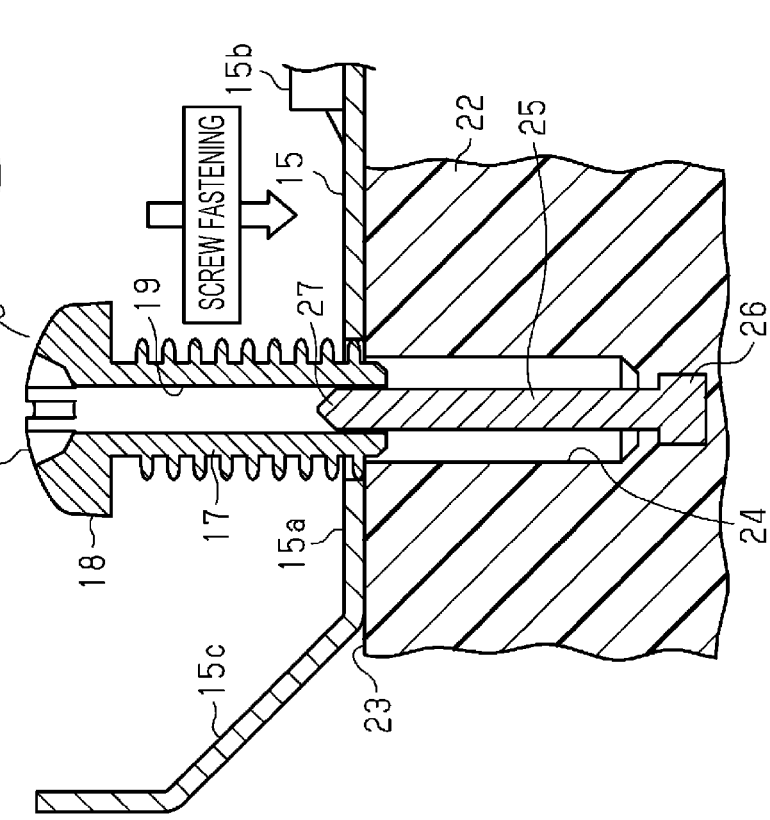
FIG. 3B is a cross-sectional view showing a terminal holding structure after screw fastening.
Figure 4:
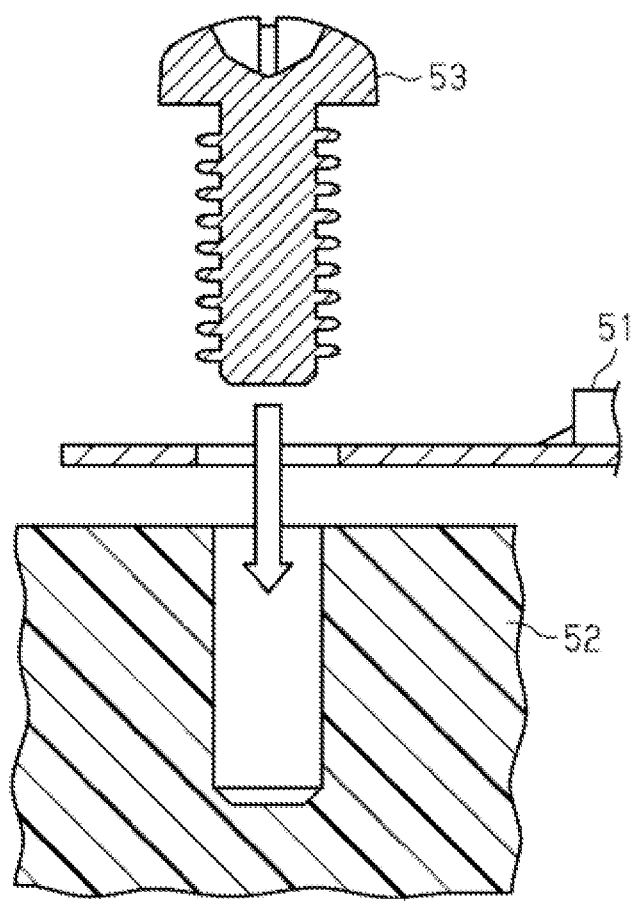
FIG. 4 is a cross-sectional view showing a conventional terminal holding structure.

As shown in FIGS. 3A and 3B, a screw insertion hole 24 that is slightly smaller in diameter than the shaft portion 17 of the screw 16 is formed facing downward from the fastening surface 23 in the terminal accommodation portion 22. The diameter of the screw insertion hole 24 is set to be less than 3 millimeters, for example. Also, the inner surface of the screw insertion hole 24 is a smooth surface on which no screw thread is formed.

Also, in the terminal accommodation portion 22, a guide pin 25 made of metal is provided through insert molding so as to correspond to the screw insertion hole 24. For example, an iron-based or copper-based metal can be used as the material of the guide pin 25. The guide pin 25 has a base end portion 26 in the vicinity directly below the screw insertion hole 24 and extends straight upward from the base end portion 26, and the peak of the leading end portion 27 is located approximately 2 to 3 millimeters above the fastening surface 23. Also, the outer diameter of the guide pin 25 is set to about 1 millimeter. The outer surface of the guide pin 25 is a smooth surface on which no screw thread is formed. The guide pin 25 corresponds to an example of a guide member for matching the direction in which the screw 16 advances with a prescribed direction. In the present embodiment, the prescribed direction is the vertical direction orthogonal to the fastening surface 23, which is a horizontal surface.

A screw 16 such as a tapping screw made of metal has a cylindrical shaft portion 17 with a screw thread formed on its outer surface, and a cylindrical head portion 18 that is greater in diameter than the shaft portion 17, and a through hole 19 is formed along the axis of the screw 16. Note that the shaft portion 17 of the screw 16 is preferably cylindrical such that the guide pin 25 can be inserted therein, but for example, approximately the upper half of the head portion 18 excluding the region in which the leading end portion 27 of the guide pin 25 is to be inserted may also be solid. In the present embodiment, the outer diameter of the cylindrical shaft portion 17 is set to about 3 millimeters, and the outer diameter of the head portion 18 is set to about 5 millimeters. Also, the inner diameter of the shaft portion 17 and the inner diameter of the head portion 18 are the same as each other, and are each set to, for example, about 1.5 millimeters in correspondence with the thickness of the guide pin 25 to be inserted in the shaft portion 17. Furthermore, the height of the shaft portion 17 is approximately the same as the depth of the screw insertion hole 24. The inner surface of the shaft portion 17 and the inner surface of the head portion 18 are both smooth surfaces on which no screw thread is formed.

Also, the terminal 15 is set on the guide pin 25, the screw 16 is set such that the cylindrical shaft portion 17 is placed on the leading end portion 27 of the guide pin 25, and the fastening task is performed while aligning the screw 16 with the guide pin 25. Note that during the above-described setting, the screw 16 is placed such that the leading end portion of the shaft portion 17 of the screw 16 passes through the insertion hole of the terminal 15 and the leading end portion the screw thread formed on the outer surface of the shaft portion 17 engages with the peripheral edge portion of the screw insertion hole 24, that is, the fastening surface 23. In other words, the fastening surface 23 is located at the height at which the advancement of the screw thread is started. Then, the shaft portion 17 advances into the screw insertion hole 24 while the screw thread of the shaft portion 17 cuts a screw groove in the inner surface of the screw insertion hole 24, and when the lower surface of the head portion 18 comes into areal contact with no gaps with the upper surface of the terminal 15 and the lower surface of the terminal 15 comes into areal contact with no gaps with the fastening surface 23, the fastening task is complete. At this time, the leading end portion 27 of the guide pin 25 completely overtakes the shaft portion 17 and reaches a medium height position of the head portion 18. Note that when the fastening tool is removed, the guide pin 25 will be visible from the upper portion side of the screw 16 through the through hole 19.

Here, the terminal 15 has a flat plate-shaped terminal main body portion 15a that is fixed to the fastening surface 23 with the screw 16, a wire connection portion 15b at which the wire 12 is connected through crimping or the like, and a spring portion 15c that functions as an electrical contact portion that is electrically connected due to coming into elastic contact with an ECU (Electronic Control Unit) for charge control (not shown). The ECU for charge control corresponds to the connection destination of the terminal 15. Also, after the terminal 15 is fastened to the terminal accommodation portion 22 with the screw 16 as described above, the terminal 15 and the above-described ECU are electrically connected while the ECU is sandwiched between the housing 11 and the cover member 13 against the elastic force of the spring portion 15c, and for example, the cover member 13 is locked to the housing 11 using a snap-fit structure. Accordingly, the battery wiring module 10 shown in FIG. 1 is obtained.

As described above, according to the present embodiment, it is possible to exhibit the following operations and effects.

(1) In the terminal accommodation portion 22, the guide pin 25 for matching the direction in which the screw 16 advances with the vertical direction orthogonal to the fastening surface 23 is provided, and therefore it is possible to avoid inclined fastening while easily matching the direction in which the screw 16 advances with the vertical direction by performing the fastening task while aligning the screw 16 with the guide pin 25. Accordingly, the specialty task can be mitigated, and the task efficiency of the fastening task can be improved.

(2) Since no screw thread is formed on the inner surface of the screw insertion hole 24, the screw 16 is likely to advance freely and inclined fastening is likely to occur. However, due to the screw 16 being guided by the guide pin 25, inclined fastening is avoided, and high connection reliability can be obtained. That is, it is possibly to overcome the state in which inclined fastening is likely to occur.

(3) Since the leading end portion 27 is located upstream in the advancement direction of the screw 16 with respect to the fastening surface 23 located at the height at which the advancement of the screw thread is started in the guide pin 25, it is possible to set the screw 16 such that the cylindrical shaft portion 17 is placed on the leading end portion 27 of the guide pin 25 at an earlier stage than when the advancement of the screw thread is started. Accordingly, it is possible to smoothly realize automation of screw fastening.

(4) Since no screw threads are formed on the inner surface of the cylindrical shaft portion 17 of the screw 16 and the outer surface of the guide pin 25 to be inserted into the shaft portion 17, it is possible to cause the screw thread formed on the outer surface of the cylindrical shaft portion 17 of the screw 16 to smoothly advance, and the fastening task can be suitably carried out.

(5) Since a high strength is obtained by using the guide pin 25 made of metal, even if the present invention is applied to a small-sized holding structure in which a screw 16 with a small diameter is guided by a narrow guide pin 25, it is possible to suitably carry out the fastening task.

(6) Since the terminal accommodation portion 22 is composed of a material that is softer than that of the screw 16, the screw 16 easily advances freely and inclined fastening is likely to occur. However, due to the screw 16 being guided by the guide pin 25, inclined fastening is avoided and high connection reliability can be obtained. That is, it is possible to overcome the state in which inclined fastening is likely to occur.

(7) Since the spring portion 15c that is electrically connected by coming into elastic contact with an ECU for charge control is provided on the terminal 15, if inclined fastening occurs, suitable elastic contact cannot be obtained due to wobbling of the terminal 15, and thus the connection reliability is likely to be lost. In this respect, due to the screw 16 being guided by the guide pin 25, wobbling of the terminal 15 is avoided, and suitable elastic contact can be obtained. That is, it is possible to overcome the state in which the connection reliability is likely to be lost.

(8) The leading end portion 27 of the guide pin 25 protrudes from the outer surface of the insulating material forming the housing 11 (the bottom of the screw insertion hole 24), and the base end portion 26 of the guide pin 25 is embedded in the insulating resin material forming the housing 11. The base end portion 26 of the guide pin 25 may be formed to be wider than the leading end portion 27 of the guide pin 25. Accordingly, when the fastening task is performed while aligning the screw with the guide pin 25, it is possible to reduce or prevent a case in which the guide pin 25 inclines with respect to the axis of the screw through hole 24 due to the wide base end portion 26, and the fastening task can be carried out suitably.

Note that the above-described embodiment can be carried out with the following modifications. The above-described embodiment and the following modifications can be implemented in combination with each other as long as no technical discrepancy occurs.

The prescribed direction in which the screw 16 advances is not limited to the vertical direction, and may also be a horizontal direction or an inclined direction that matches the forming direction of the screw insertion hole 24. In short, it is sufficient to use a configuration in which the screw 16 is fastened while being guided by the guide pin 25 along the forming direction of the screw through hole 24. For example, it is also possible to use a configuration in which the screw 16 is fastened upward from below.

Although it is advantageous to combine a configuration in which the guide pin 25 is provided with a configuration in which the screw threads are not formed on the inner surface of the screw insertion hole 24 in that the effect of (2) above, of being able to overcome the state in which inclined fastening is likely to occur, can be obtained, screw threads may also be formed on the inner surface of the screw insertion hole 24.

In the guide pin 25, the peak of the leading end portion 27 may have the same height as the fastening surface 23, or a height that is located below the fastening surface 23.

Screw threads may also be formed on one of the inner surface of the cylindrical shaft portion 17 of the screw 16 and the outer surface of the guide pin 25 that is inserted into the shaft portion 17, in a range in which the screw threads formed on the outer surface of the cylindrical shaft portion 17 of the screw 16 can be caused to advance smoothly.

The guide pin 25 may also be made of resin, under the condition that the needed strength (e.g., bending resistance) can be obtained. If the guide pin 25 is made of resin, it is possible to provide a guide pin 25 through single-color molding using the same material as the housing 11, or two-color molding using another material.

In addition to the materials of the housing 11, the screw 16, and the guide pin 25, the shape and the like of the terminal 15 are not limited to the above-described embodiment.

There is no limitation to the terminal holding structure and the wiring module to be applied to the vehicle.

The housing 11 of the illustrated embodiment is referred to as a base made of synthetic resin, which can be insulating resin, in some cases. The head portion 18 of the screw 16 of the illustrated embodiment may be configured to engage with and be rotated by any rotation tool such as a screw driver, a spanner, or an Allen key.

The present disclosure encompasses the following implementation examples. Reference signs of constituent elements of the embodiment are added not to limit the meaning but to facilitate comprehension.

Supplementary Note 1

One or more implementation examples of the present disclosure are directed to a tapping screw (16), in which the tapping screw (16) can include a screw shaft portion (17) that has a base end and a leading end, a head portion (18) that is formed in one piece with the base end of the screw shaft portion (17), and a central hole (19) that forms an opening on the leading end of the screw shaft portion (17) and extends linearly along the axis of the screw shaft portion (17) toward the head portion (18).

Supplementary Note 2

In one or more implementation examples of the present disclosure, the head portion (18) of the tapping screw (16) can be configured to be rotatable by a rotating tool.

Supplementary Note 3

In one or more implementation examples of the present disclosure, the central hole (19) can penetrate through the screw shaft portion (17) and form an opening in the head portion (18).

Supplementary Note 4

In one or more implementation examples of the present disclosure, the tapping screw (16) can be used together with a base (11) that includes a screw insertion hole (24) and is made of a synthetic resin material and a guide pin (25) having a base end portion (26) and a leading end portion (27), the screw insertion hole (24) has a smooth inner peripheral surface, the base end portion (26) of the guide pin (25) is embedded in the synthetic resin material forming the base (11), and the leading end portion (27) of the guide pin (25) protrudes from the bottom of the screw insertion hole (24) and extends along the axis of the screw insertion hole (24), and when the tapping screw (16) is screwed into the screw insertion hole (24), the leading end portion (27) of the guide pin (25) advances into the central hole (19) of the tapping screw (16), and the outer surface of the leading end portion (27) of the guide pin (25) can come into areal contact with the inner surface of the central hole (19) of the tapping screw (16).

Supplementary Note 5

In one or more implementation examples of the present disclosure, the base end portion (26) of the guide pin (25) may be thicker than the leading end portion (27).

Supplementary Note 6

In one or more implementation examples of the present disclosure, the length of the guide pin (25) may be greater than the depth of the screw insertion hole (24).

Supplementary Note 7

In one or more implementation examples of the present disclosure, the tapping screw (16) can be configured to fasten a metal terminal (16) of an electrical circuit to the base (11) in a fixed manner.

Supplementary Note 8

In one or more implementation examples of the present disclosure, the metal terminal (16) can include a wire connection portion that is fixed to a conductive core wire of a wire (12), and a plate-spring-shaped free end (15c).

It should be evident to a person skilled in the art than the present invention may also be realized in other unique modes without departing from the technical idea. For example, some of the components described in the embodiment (or one or more modes thereof) may also be omitted, and several components may also be used in combination with each other. The scope of the present invention is to be defined with reference to the accompanying claims, together with the full range of equivalents to which the claims are entitled.

LIST OF REFERENCE NUMERALS

10 Battery wiring module serving as wiring module
15 Terminal
15c Spring portion
16 Screw
17 Shaft portion
22 Terminal accommodation portion serving as case
23 Fastening surface
24 Screw insertion hole
25 Guide pin serving as guide portion
27 Leading end portion

What is claimed is:

1. A terminal holding structure in which a terminal is fastened to a case with a screw,
wherein a guide for matching a direction in which the screw advances with a prescribed direction is provided in the case,
the guide is a guide pin made of metal.

2. The terminal holding structure according to claim 1,
wherein the screw has a shaft portion with a screw thread formed on its outer surface, and
a screw insertion hole into which the shaft portion is to be inserted is formed in the case, and an inner surface of the screw insertion hole is a smooth surface on which no screw thread is formed.

3. The terminal holding structure according to claim 1,
wherein the screw has a cylindrical shaft portion with a screw thread formed on its outer surface, and
the guide is the guide pin that is to be inserted into the cylindrical shaft portion of the screw, and a leading end portion of the guide pin is located on an upstream side in the advancement direction of the screw relative to a fastening surface that is located at a height at which advancement of the screw thread is started.

4. The terminal holding structure according to claim 3,
wherein at least one of the inner surface of the cylindrical shaft portion of the screw and an outer surface of the guide pin to be inserted into the shaft portion is a smooth surface on which no screw thread is formed.

5. The terminal holding structure according to claim 1,
wherein the case is composed of a material that is softer than that of the screw.

6. A wiring module in which a terminal is fastened to a case with a screw,
wherein a guide for matching a direction in which the screw advances with a prescribed direction is provided in the case,
a spring portion that is electrically connected by coming into elastic contact with a connection destination of the terminal is provided on the terminal, and
the guide is a guide pin made of metal.

7. The wiring module according to claim 6,
wherein the screw has a cylindrical shaft portion with a screw thread formed on its outer surface, and
the guide is the guide pin that is to be inserted into the cylindrical shaft portion of the screw, and a leading end portion of the guide pin is located on an upstream side in the advancement direction of the screw relative to a fastening surface that is located at a height at which advancement of the screw thread is started.

8. A terminal holding structure in which a terminal is fastened to a case with a screw,
wherein a guide for matching a direction in which the screw advances with a prescribed direction is provided in the case,
the screw has a cylindrical shaft portion with a screw thread formed on its outer surface, and
the guide is a guide pin that is to be inserted into the cylindrical shaft portion of the screw, and a leading end portion of the guide pin is located on an upstream side in the advancement direction of the screw relative to a fastening surface that is located at a height at which advancement of the screw thread is started.

* * * * *